(12) United States Patent
Johnston

(10) Patent No.: US 10,327,422 B2
(45) Date of Patent: Jun. 25, 2019

(54) DOG LEASH CLIP

(71) Applicant: Daniel U. Johnston, Nokomis, FL (US)

(72) Inventor: Daniel U. Johnston, Nokomis, FL (US)

( * ) Notice: Subject to any disclaimer, the term of this patent is extended or adjusted under 35 U.S.C. 154(b) by 168 days.

(21) Appl. No.: 15/631,630

(22) Filed: Jun. 23, 2017

(65) Prior Publication Data

US 2018/0374395 A1    Dec. 27, 2018

(51) Int. Cl.
| | | |
|---|---|---|
| *A01K 27/00* | (2006.01) | |
| *F16B 45/06* | (2006.01) | |
| *G09F 3/16* | (2006.01) | |
| *F16G 15/08* | (2006.01) | |
| *B29L 31/00* | (2006.01) | |

(52) U.S. Cl.
CPC .......... *A01K 27/005* (2013.01); *A01K 27/003* (2013.01); *F16B 45/06* (2013.01); *F16G 15/08* (2013.01); *G09F 3/16* (2013.01); *B29L 2031/7282* (2013.01)

(58) Field of Classification Search
CPC .............................. A01K 27/005; F16B 45/06
See application file for complete search history.

(56) References Cited

U.S. PATENT DOCUMENTS

| | | | | |
|---|---|---|---|---|
| 550,189 | A * | 11/1895 | Melka ..................... | F16B 45/06 24/598.5 |
| 648,050 | A * | 4/1900 | Owens .................. | A01K 27/005 119/776 |
| 1,646,745 | A * | 10/1927 | Carpmill .............. | A01K 27/005 24/371 |
| 2,637,088 | A * | 5/1953 | Foster .................. | A01K 27/005 24/598.5 |
| 2016/0215812 | A1 * | 7/2016 | Durfee .................. | F16B 45/025 |

\* cited by examiner

*Primary Examiner* — Daniel J Colilla

(57) ABSTRACT

A clip composed of two similar hooks, pivoting around a common axis, and facing each other. Hooks are biased toward each other around the common pivot by a torsion spring. The two hooks form a loop that retains a dog collar D ring. The tips of the hooks overlap each other, allowing each hook to carry half the load. Finger pads are positioned opposite the hooks, such that when pressure is applied to the finger pads, the hooks are separated, and an ejector tab forces the dog collar D ring into the opening between the hooks, releasing the dog collar D ring. This clip is cold temperature tolerant.

1 Claim, 3 Drawing Sheets

PRIOR ART

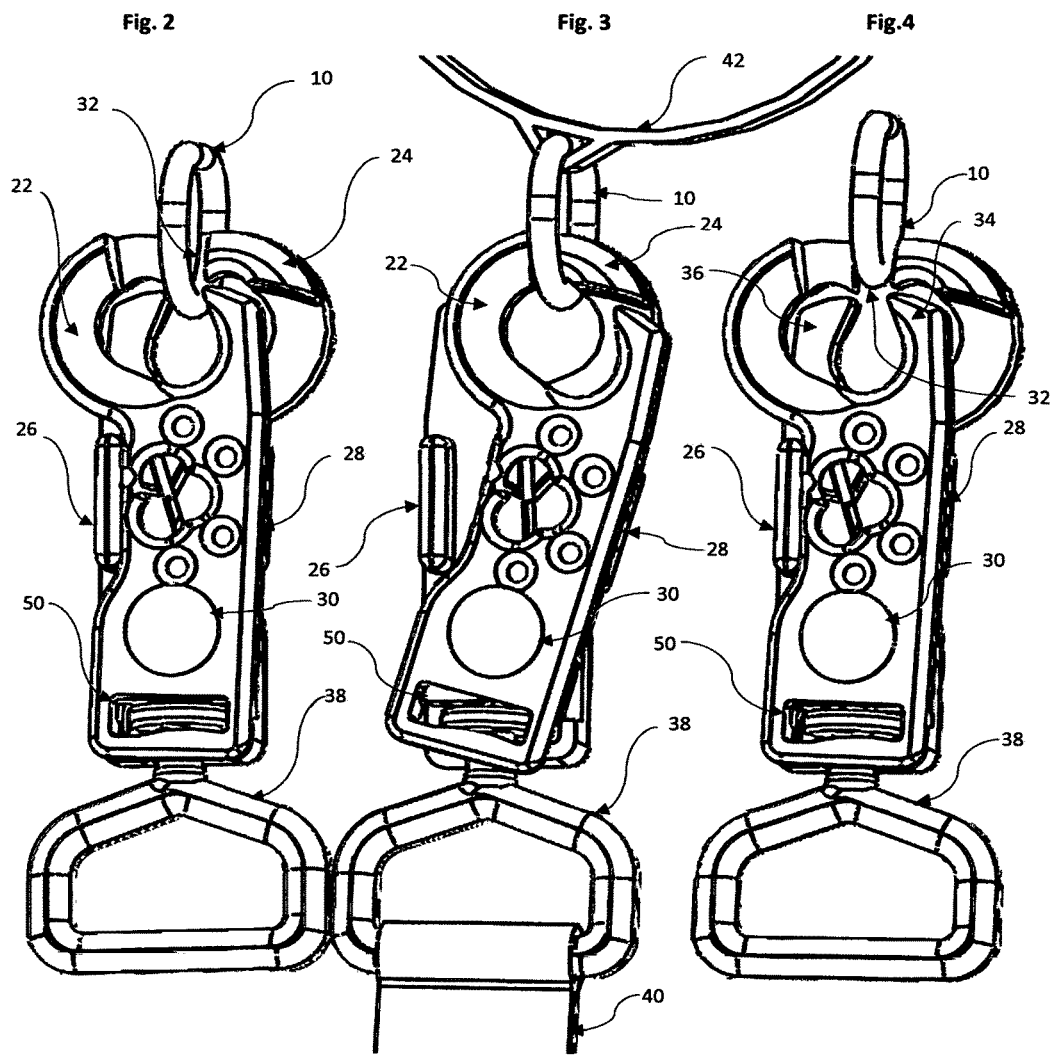

Fig. 5
Fig. 6
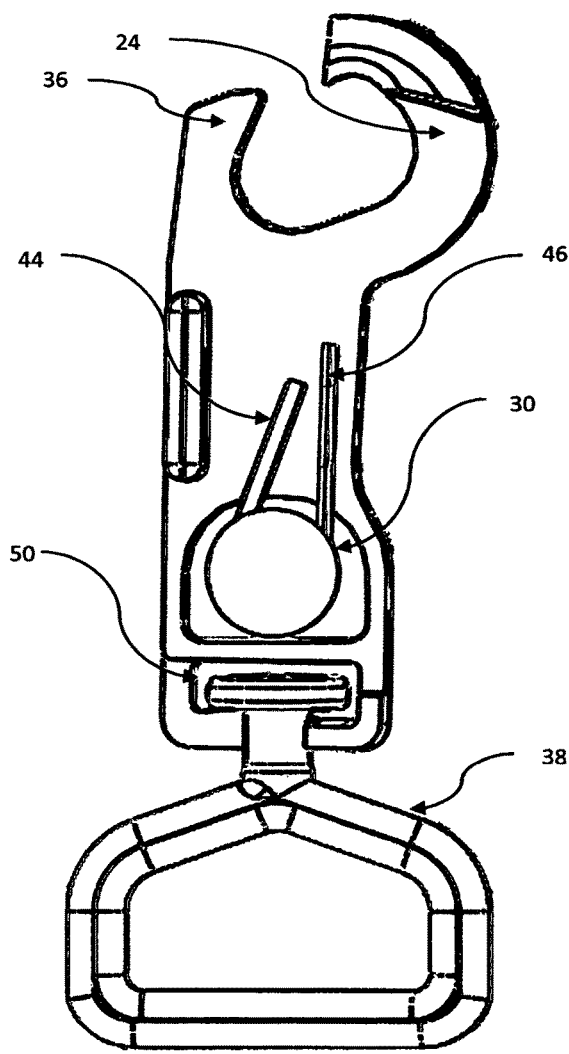
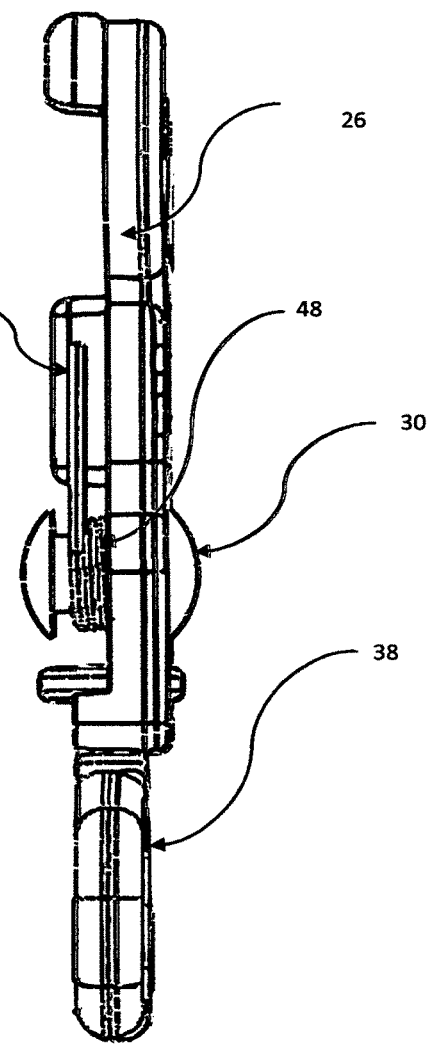

DOG LEASH CLIP

CROSS-REFERENCE TO RELATED APPLICATIONS

Background—Prior Art

Following is a tabulation of some prior art that presently appears relevant:

| Pat. No. | Issue Date | Patentee |
|---|---|---|
| 548,062 | 1895 Oct. 15 | Joyner |
| 1,390,129 | 1921 Sep. 6 | Hesse |
| 5,462,019 | 1995 Oct. 31 | Hong-Rong |
| 6,095,094 | 2000 Aug. 1 | Phillips |
| 9,370,169B2 | 2016 Jun. 21 | Finlan |

BACKGROUND OF PRIOR ART

Prior art dog leash clip patents go as far back as year 1895, when Isaac Joyner of Anderson Ind. was granted a U.S. Pat. No. 548,062 that pictured a snap hook very similar to the dog leach clips used today. The clip was not precisely described, but the drawing is very similar to today's production clip. U.S. Pat. No. 5,462,019 by Hong-Rong, in 1995 had a clear description of the prior art clip, line 53 through line 61, column 2.

There are two features of the prior art clip that cause a problem. The position of your fingers for opening the clip creates excessive friction on the plunger, making the overall required force excessive. With continued use, the friction increases, resulting in even higher resistance to opening the clip.

A second problem occurs in cold climates. Water can collect inside the clip and freeze. Ice inside the clip prevents opening the clip and releasing the dog collar, until the ice has melted.

SUMMARY OF THE INVENTION

This invention offers a solution to the problems of opening and closing prior art dog clips. A simple process of applying pressure with your thumb and forefinger to the finger pads will open the clip. The finger location and motion with the prior art clip can best be described as awkward and difficult, while the finger location and motion with this invention can be described as natural and easy.

DESCRIPTION OF DRAWINGS

FIG. 2 The new design clip showing the simple process of inserting a D ring.

FIG. 3 The new design clip showing the complete connection between dog leash and dog collar.

FIG. 4 The new design clip showing the process of releasing the D ring.

FIG. 5 The new design clip front view with the front hook removed, showing rear hook & related parts.

FIG. 6 The new design clip side view with the front hook removed, showing rear hook & related parts.

PRIOR ART DESCRIPTION

Figure 1:
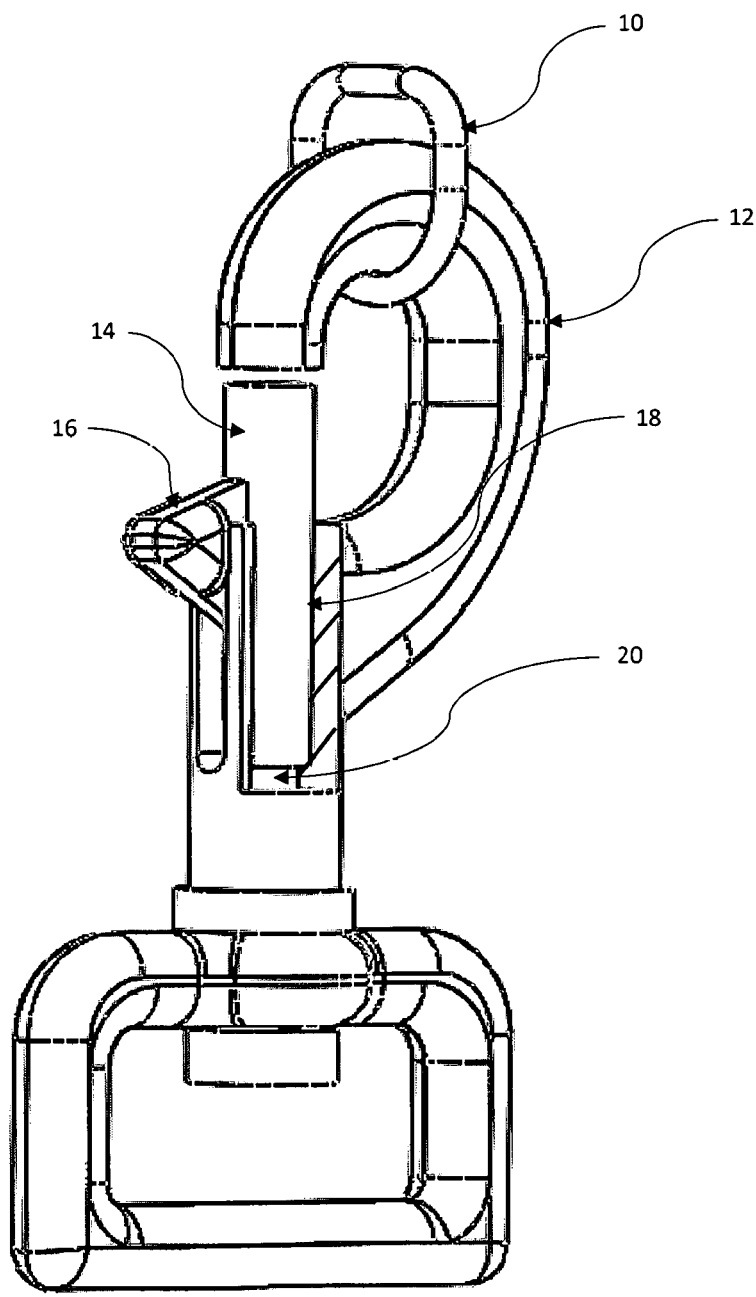
FIG. 1 A prior art clip showing the problems in using this prior art design.

Relating to the drawing FIG. 1, a D ring 10 that is attached to a dog collar (not shown), is retained within the hook 12. For charity, a hook section 18 is shown. A spring (not shown) is located in the spring chamber 20, and pushes up on the plunger 14, retaining D ring 10 within hook 12. To release D ring 10 from hook 12, finger pressure is applied to the plunger tab 16 until the space is opened.

This drawing illustrates the problem with this current design. When force is applied to the upper face of plunger tab 16, pressure is at an angle in relation to the plunger 14 centerline, which then creates friction between plunger 14 and the inside surface of the spring chamber 18. The addition of friction and the spring force makes it difficult to open the clip.

Water can collect in the chamber 20. When the temperature is below freezing, ice will form and block any movement of plunger 14, preventing any release of D ring 10.

DESCRIPTION OF THIS INVENTION

Relating to FIG. 2, The front hook 22, and rear hook 24, pivot around the rivet 30. Applying pinching finger pressure to the rear finger pad 26 and front finger pad 28 opens up a gap 32 between the two hooks 22 & 24.

Relating to FIG. 3. A dog collar 42 is attached to the D ring 10. When the finger pressure between the two finger pads 26 & 28 is released, a torsion spring (not shown) applies force to hooks 22 & 24, rotating both hooks towards each other to form a closed structure that captures D ring 10. A swivel loop 38, is captured by rectangular openings 50 in the two hooks 22 & 24. A dog leash 40 is attached to the swivel loop 38. This completes the physical connection between dog collar 42 and dog leash 40.

Relating to FIG. 4. Applying finger pressure between rear finger pad 26 and front finger pad 28 will open the gap 32, providing room for the D ring 10 to exit the clip. The front ejector tab 34 and rear ejector tab 36 centers D ring 10 in gap 32, allowing D ring 10 to be released.

Relating to FIG. 5, the front hook 22 is removed from view, showing the inside face of the rear hook 24, the rear hook torsion spring arm 44, and the front hook torsion spring arm 46. The two spring arms 44 & 46 are configured to rotate away from each other, which forces the front hook 22 (not shown) and rear hook 24 to come together. The rear hook torsion spring arm 44 lies in pocket of rear hook 24, providing a means of transferring force to hook 24, and likewise the other spring arm 46 lies in a pocket of front hook 22.

Relating to FIG. 6, The torsion spring 48 is concentric with the rivet 30.

The embodiments of the invention in which an exclusive property or privilege is claimed are defined as follows:

1. A dog leash clip comprising:
   two similar hook bodies, each hook body including a hole, a finger pad, a rectangular opening, and an ejector tab;
   a rivet positioned in the holes of the hook bodies forming a common axis which the hook bodies pivot around;
   a torsion spring that forces the hook bodies together so that the hook bodies form a circular hole, wherein finger pressure applied to the finger pads can overcome the force of the torsion spring allowing said hook bodies to be separated forming a gap between the hook bodies, whereby a D ring can enter a space formed between said hook bodies, and whereby when pressure is removed from said finger pads, the torsion spring forces the hook bodies to close and reform the circular hole thereby capturing said D ring;
   a swivel loop retained within said rectangular openings of said hook bodies allowing said swivel loop to rotate freely, wherein the swivel loop is configured to attach to a dog leash and the D ring is configured to attach to a dog collar thus completing a connection between said dog leash and said dog collar; and wherein when finger pressure is applied to the finger pads, thus pivoting the hook bodies, the ejector tab moves said captured D ring to the center of said gap between the hook bodies thereby allowing said D ring to be released from said dog leash clip and thereby released from said dog leash.

* * * * *